United States Patent Office 3,076,145
Patented Jan. 29, 1963

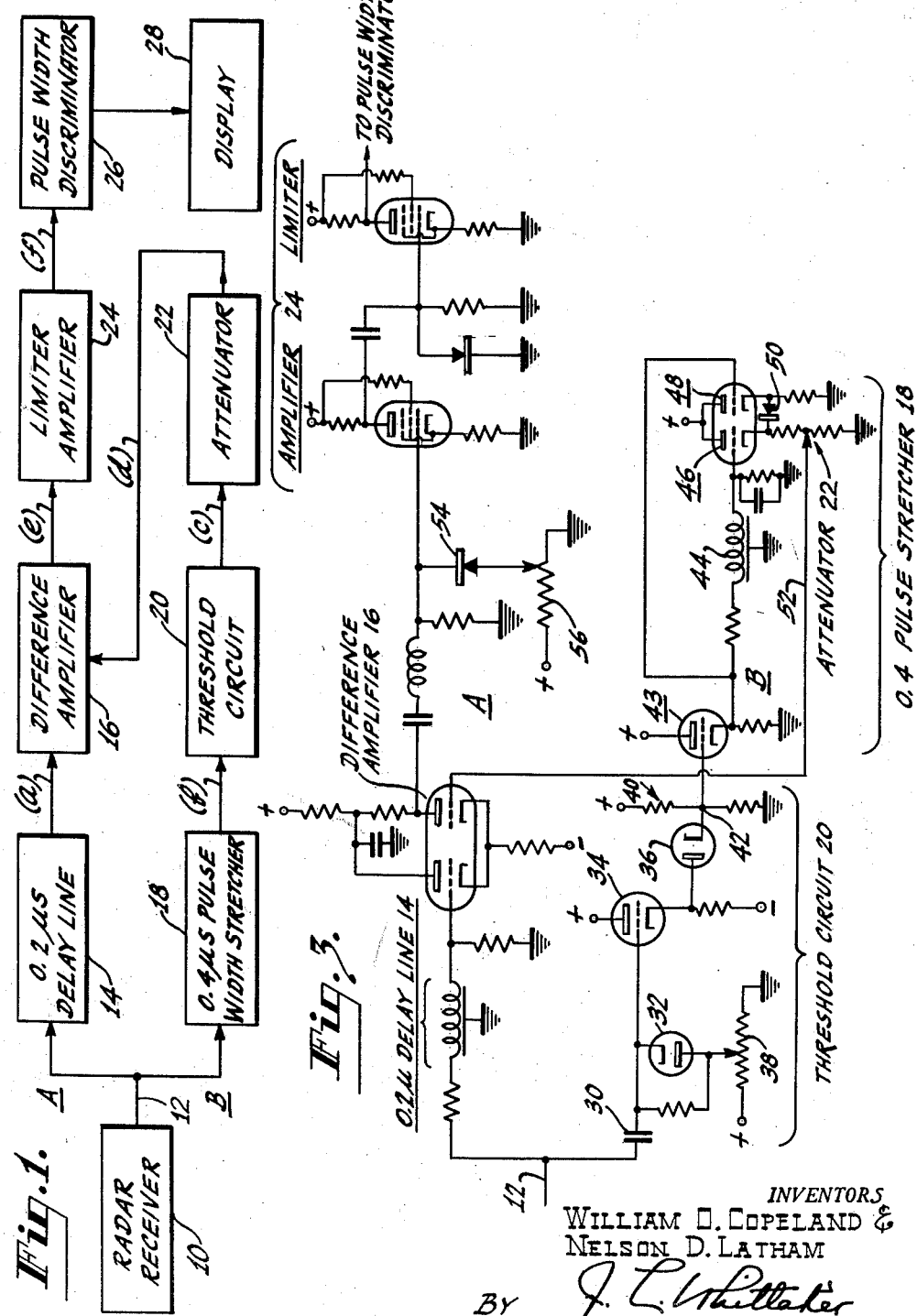

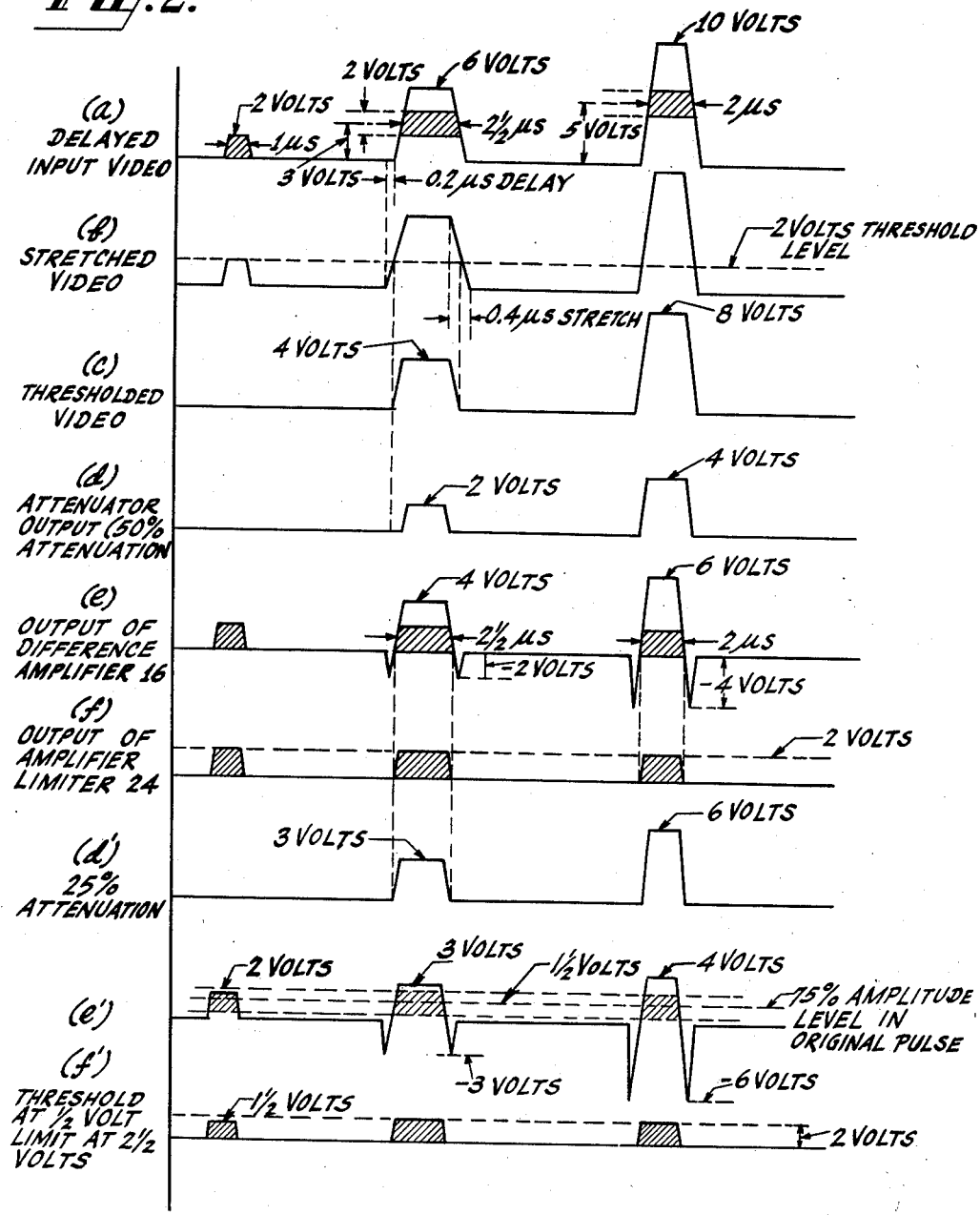

3,076,145
PULSE DISCRIMINATING CIRCUIT
William O. Copeland, Runnemede, and Nelson D. Latham, Haddon Heights, N.J., assignors to Radio Corporation of America, a corporation of Delaware
Filed Aug. 26, 1959, Ser. No. 836,281
4 Claims. (Cl. 328—165)

The present invention relates to a new and improved circuit for discriminating among pulses of differing amplitudes and/or widths, and is particularly applicable to the problem of eliminating ground clutter in a radar system.

In radar systems generally and particularly in airborne radar systems, energy reflected from the ground produces an objectionable indication on the radar screen known as "ground clutter." If the clutter is not eliminated, its presence may be confusing, first because it may be mistaken for a target of interest and second because it may produce sufficient illumination on the screen to obscure targets which are in the same general direction and range.

It has been previously proposed that clutter may be eliminated by applying to the indicator only those return pulses which are narrower than a given width. A pulse width discriminator circuit may be used for this purpose. The assumption is that a ground return pulse, since it is reflected from a large area target which is not perpendicular to the radiated beam axis will be relatively wide, whereas a target return pulse from an aircraft or the like, which is relatively small compared to the beam cross section, will be relatively narrow. In some applications this solution has not been entirely satisfactory. A very large amplitude pulse, for example, will be wider at its base than a pulse of lower amplitude from a similar target. Moreover, under conditions of noise, the noise may add to the pulse and make its base appear much wider than it actually is. Accordingly, the difficulty with this system is that some return pulses will look to the pulse width discriminator circuits as if they are reflected from ground whereas they are, in fact, reflected from aircraft or other targets of interest.

A general object of the present invention is to provide an improved circuit for sensing pulse width.

Another object of the invention is to provide an improved circuit for eliminating or reducing ground clutter from received radar signals.

According to the present invention, the width of each return pulse is sensed not at its base level but instead at a level which is a selected percentage of the pulse amplitude. As one example, a portion may be taken through each pulse centered about its particular 50% amplitude level and that portion applied to the pulse width discriminator. A preferred circuit for accomplishing this includes means for attenuating the return pulses by a predetermined percentage; means for taking the difference between each input pulse and the corresponding attenuated pulse derived from it; and means for passing the resultant pulses through a limiter and, if necessary, a threshold circuit to a pulse width discriminator.

The invention will be described in greater detail by reference to the following description taken in connection with the accompanying drawing in which:

FIG. 1 is a block circuit diagram of a preferred form of the present invention;

FIG. 2 is a drawing of waveforms present at various points in the circuit of FIG. 1; and FIG. 3 is a schematic circuit diagram of an embodiment of the invention similar to the one shown in block form in FIG. 1.

Similar reference characters are applied to similar elements throughout the drawings.

Referring to FIGS. 1 and 2, radar receiver 10 receives return radio frequency pulses (echoes) from ground and from targets of interest. These return pulses may vary in both amplitude and width. The receiver provides video pulses at its output lead 12. In a typical system, the transmitted radar pulses may be of the order of a microsecond in width, the received pulses from aircraft or the like of approximately the same width, and the return pulses from ground may vary in width from approximately this same width to several times this width.

The video pulses at lead 12 are applied to two parallel channels. The upper channel A includes a delay line 14 which slightly delays the pulses. The delayed pulses $a$ are applied as one input to difference amplifier 16. Pulses $a$ are shown in FIG. 2a. For purposes of illustration, the first pulse shown is relatively narrow, about 1 microsecond wide at the 50% amplitude level, and is 2 volts in amplitude. The second pulse is about 2½ microseconds wide at the 50% amplitude level and is 6 volts in amplitude. The third pulse is 2 microseconds wide at the 50% amplitude level and is 10 volts in amplitude. According to one specific form of the present invention, it is desired to compare the 2 volt portion of each pulse centered on the 50% amplitude level. These portions are shown cross-hatched in FIG. 2a.

The lower channel B includes a 4/10 microsecond pulse-width stretcher 18. Since the stretched pulses, in attenuated form, in channel B are to be subtracted from the channel A pulses, the latter should be delayed slightly. The 0.2 microsecond delay line 14 in the channel A accomplishes this. The stretched pulses $b$ are shown in FIG. 2b.

The stretched pulses $b$ are applied to a threshold circuit 20 the purpose of which is to eliminate all pulses of lower than a selected value. In the typical circuit chosen for purposes of illustration, the threshold circuit is set at 2 volts as indicated in FIG. 2b. The thresholded pulses $c$ are applied to an attenuator 22. The level to which the attenuator is set determines the amplitude level about which the selected pulse portion is centered. In the case illustrated first, the attenuator 22 is set for 50% attenuation. The attenuator output $d$ is shown in FIG. 2d. The first input pulse is 2 volts in amplitude and it therefore does not pass through threshold circuit 20 when it is set at a two volt threshold. The second pulse is 6 volts in amplitude and it is therefore reduced to 4 volts at $c$. The attenuated pulse is then 2 volts. Similarly, the attenuated, thresholded third pulse is 4 volts in amplitude.

Difference amplifier 16 provides output pulses corresponding in amplitude to the difference between corresponding pulses $a$ and $d$. The result is as shown in FIG. 2e. The first pulse passes without change since zero volt is subtracted from it. The second 6 volt pulse has 2 volts subtracted from it and accordingly a 4 volt pulse results. There is a 2 volt break in base line at the leading and lagging edges of this pulse but, if found to be objectionable, it can readily be eliminated by clamping in the following stage 24. It will be noted that the 2 volt portion of interest which is shown cross-latched in FIG. 2e, now extends from zero to 2 volts. In a similar manner, the third input pulse, after processing by the difference amplifier, appears as a 6 volt pulse at $e$. Here too, the 2 volt pulse of interest, that is, the one centered about the 50% amplitude level of the third input pulse now is between zero and 2 volts.

Limiter amplifier 24 passes those portions of the pulses applied to it of 2 volts amplitude or less. Thus, its output pulses are as shown in FIG. 2f. These pulses are all 2 volts in amplitude and are the same widths as the input pulses at the 50% input level. They are applied through a pulse-width discriminator to the display 28 which, for example, may be of the plan position indication (P.P.I.) type and may employ a cathode ray indicator. The pulse-width discriminator may be set at any value desired. For example, if adjusted to pass all pulses up to 2 microseconds in duration, the first and third pulses would pass and the second would not.

In the example illustrated above, portions of the input pulses centered about the 50% amplitude level are applied to pulse-width discriminator 26. It should be appreciated, however, that the invention is not limited to the selection of pulse portions centered on the 50% amplitude level. Any other percentage of maximum level may be chosen by appropriately adjusting attenuator 22 and clipper amplifier 24. FIGS. 2d, e' and f' illustrate the operation of the circuit when it is desired to select pulse portions centered on the 75% amplitude level of the input pulses. Attenuator 22 is now adjusted to attenuate the pulses applied to it by 25%. Clipper amplifier 24 in this case passes those portions of input pulses which are greater in amplitude than ½ volt and lower in amplitude than 2 volts. In this case, a bias diode in stage 24 (such as diode 54 shown in FIG. 3) may be used for the ½ volt thresholding function.

In the typical schematic circuit of FIG. 3 the threshold circuit 20 is in front of the pulse stretcher 18 whereas in the circuit of FIG. 1 the stages are reversed. Either arrangement may be used.

The overall circuit operation has already been explained. Following is a brief description of the individual circuit components.

The delay line 14 in channel A is a distributed constant delay line. The line is terminated at both ends in its characteristic impedance to minimize distortion. The bandwidth is sufficiently large (greater than 7 megacycles in a typical circuit) compared to other stages in the video channel that the delay line distortion is negligible.

The remainder of the upper channel consists of elements which in themselves are conventional. Difference amplifier 16, for example, is a pair of cathode-to-cathode coupled triodes. One input is from the delay line in channel A and the other from the output of the voltage-divider attenuator 18 in channel B. The amplifier-limiter 24 following the difference amplifier 16 is a pair of pentodes, one connected as an amplifier and the other as a limiter. Diode 54 at the input to the amplifier-limiter may have an adjustable bias applied from voltage divider 56.

The threshold circuit 20 in the lower channel includes coupling capacitor 30, a first diode 32, a cathode follower 34, and a second diode 36. The coupling capacitor 30 eliminates the D.C. from the incoming pulse. The diode 32 and its source of bias voltage derived from a voltage divider 38 clamp the grid of cathode follower 34 to a new D.C. level. The D.C. level produced at the cathode of cathode follower 34 is equal to the bias at the control grid of the cathode follower plus the grid to cathode bias of the cathode follower. Diode 36 is back-biased by network 40 so that only those video pulses at the cathode of the cathode follower which exceed the bias at point 42 pass through the threshold diode 36. The effective value of the threshold is made adjustable by maintaining the bias network 40 fixed and adjusting the bias network 38.

The 0.4 microsecond pulse-width stretcher 18 includes an input cathode follower 43, a delay line 44, a pair of triodes 46 and 48 both connected as cathode followers and a diode 50 connected between the cathodes of the triodes. In operation, the pulse output of cathode follower 43 is applied directly to the control grid of triode 48 and through delay line 44 to the control grid of triode 46. The delayed and undelayed output pulses from cathode followers 46 and 48, respectively, are mixed through diode 50 to form an undelayed, stretched pulse at output lead 52. The latter is applied as the second input to difference amplifier 16.

The attenuator 22 is shown in the circuit as a simple adjustable resistive voltage divider network. It should be understood, however, that not all of the signal attenuation takes place here. Part of the attenuation is the loss of gain in the cathode followers and the delay line.

Pulse-width discriminators suitable for use in the present invention are described in Howell et al. Patent No. 2,879,504 and Ostergren et al. Patent No. 2,851,598.

What is claimed is:
1. In a circuit for detecting pulses of different widths and amplitudes, in combination, means for attenuating said input pulses by a predetermined percentage; means for deriving output pulses the amplitudes of which are a function of the difference in amplitude between each input pulse and the attenuated pulse derived therefrom, means for eliminating those portions of the resulting difference pulses having greater than a predetermined amplitude, and a pulse width discriminator responsive to the remaining portions of said resulting difference pulses.

2. In a circuit including a connection to which input pulses of different duration and amplitude may be applied, in combination, a threshold circuit connected to said connection for passing portions of the pulses of greater than a predetermined amplitude; an attenuator circuit for attenuating the thresholded pulses by a selected percentage; and a difference circuit for subtracting each attenuated pulse from the corresponding one of said applied input pulses.

3. In a circuit for discriminating between input pulses of different widths and amplitudes, in combination, a first channel including means for stretching said input pulses; means in said first channel for attenuating said stretched pulses by a predetermined percentage; a second channel including means for delaying said input pulses an amount sufficient to make them substantially time coincident with the corresponding attenuated pulses; a difference amplifier for subtracting said attenuated pulses in said first channel from said delayed pulses in said second channel; and means coupled to said difference amplifier for removing those portions of the resulting difference pulses having greater than a predetermined amplitude.

4. In a circuit as set forth in claim 3, further including a threshold circuit connected in series between said means for stretching said input pulses and said means for attenuating said input pulses.

References Cited in the file of this patent
UNITED STATES PATENTS

| | | |
|---|---|---|
| 2,489,297 | Labin et al. | Nov. 29, 1949 |
| 2,577,355 | Oliver | Dec. 4, 1951 |
| 2,866,986 | Stampfl | Dec. 30, 1958 |
| 2,985,836 | Hatton | May 23, 1961 |

FOREIGN PATENTS

| | | |
|---|---|---|
| 525,355 | Canada | May 29, 1956 |

UNITED STATES PATENT OFFICE

CERTIFICATE OF CORRECTION

Patent No. 3,076,145　　　　　　　　　　　　January 29, 1963

William O. Copeland et al.

It is hereby certified that error appears in the above numbered patent requiring correction and that the said Letters Patent should read as corrected below.

Column 3, line 12, for "2d," read -- 2d', --; column 4, line 60, for "2,866,986" read -- 2,866,896 --; line 64, for "525,355" read -- 525,696 --.

Signed and sealed this 3rd day of September 1963.

(SEAL)
Attest:

ERNEST W. SWIDER　　　　　　　　　　　　DAVID L. LADD
Attesting Officer　　　　　　　　　　　　　　Commissioner of Patents